US012577089B2

(12) United States Patent
Null et al.

(10) Patent No.: US 12,577,089 B2
(45) Date of Patent: Mar. 17, 2026

(54) APPARATUS, SYSTEM, AND METHOD FOR THE TRANSLATION AND ROTATION OF AN OBJECT

(71) Applicant: Upright Technologies, LLC, Lewisville, TX (US)

(72) Inventors: Bruce Null, Lewisville, TX (US); Kade C. Munden, Clifton, TX (US)

(73) Assignee: Upright Technologies, LLC., Lewisville, TX (US)

( * ) Notice: Subject to any disclaimer, the term of this patent is extended or adjusted under 35 U.S.C. 154(b) by 355 days.

(21) Appl. No.: 18/309,500

(22) Filed: Apr. 28, 2023

(65) Prior Publication Data

US 2024/0359961 A1 Oct. 31, 2024

(51) Int. Cl.
*B66F 9/18* (2006.01)

(52) U.S. Cl.
CPC .................................... *B66F 9/183* (2013.01)

(58) Field of Classification Search
CPC . B65G 65/23; B65G 65/24; B66F 9/18; B66F 9/183; B66F 9/16; B60B 29/00; B60B 29/001; B60B 29/002
USPC .......................... 414/652, 639, 783, 425, 419
See application file for complete search history.

(56) References Cited

U.S. PATENT DOCUMENTS 2,671,571 A * 3/1954 Gerhardt ................. B66F 9/183 294/207
3,830,387 A * 8/1974 Virnig ................... B60B 29/002 414/427
4,051,966 A * 10/1977 Cotton .................... B66F 9/183 294/902
4,340,333 A * 7/1982 Cashio ...................... B66F 9/18 414/23
4,797,050 A * 1/1989 Habicht .................... B66F 9/19 414/420
5,489,182 A * 2/1996 Habicht .................. B66F 17/00 414/420
7,118,148 B1 * 10/2006 Davis ...................... B66F 9/183 294/902
8,459,926 B2 * 6/2013 Hedley ................. B60B 29/002 414/429
2018/0056522 A1 * 3/2018 Zimmerman ........... B66F 9/183

FOREIGN PATENT DOCUMENTS

GB 694728 * 7/1953 ............. B66F 9/183

* cited by examiner

*Primary Examiner* — Mark C Hageman
(74) *Attorney, Agent, or Firm* — Whitaker Chalk Swindle & Schwartz PLLC; Enrique Sanchez, Jr.; Juan Vasquez

(57) ABSTRACT

Apparatuses, systems, and methods for the translation and rotation of an object to position the object into an upright position. In embodiments, an apparatus can include a base plate configured to attach to a clamp vehicle, a surface plate, and a rotator configured to rotatably connect the surface plate to the base plate such that the surface plate is able to rotate independently of the base plate about an axis. In embodiments, the surface plate is positioned against a proximate end of the object, and a compressive force can be applied to the object, causing the surface plate to press against the proximate end of the object. A lifting force can be applied to raise the object upwards to cause the surface plate to rotate the object toward the upright position while maintaining a secure hold on the object. The upright object can then be lowered in an upright position.

17 Claims, 15 Drawing Sheets

APPARATUS, SYSTEM, AND METHOD FOR THE TRANSLATION AND ROTATION OF AN OBJECT

TECHNICAL FIELD

The present disclosure relates generally to warehouse and transportation machinery, and more specifically to an apparatus, system, and method therefor configured to position objects into a standing position.

BACKGROUND

In a consumer-based economy, transportation and storage of goods and products is a very important element. Goods and products are transported using various forms of transportation including railroad vehicles, ships, trucks, airplanes, etc. Typically, the goods and products are transported in contains, such as boxes and/or shipping containers. In these cases, the packaged products are loaded onto a vehicle (e.g., railroad car, shipping container, truck bed, cargo plane, etc.), and are transported to a destination. Typically, the destination is a warehouse where the products are stored for distribution to consumers. In a typical day, many thousands of products are transported across the country and/or the world.

When transporting these products, the products are positioned in a certain position. For example, many products may be configured so as to have an orientation. In some cases, the orientation of a product may include an upright (e.g., a standing up) orientation and a prone-lying orientation. For example, a refrigerator may have a upright orientation, which may include the orientation in which the refrigerator may be designed to operate, and a prone-lying orientation, which may include the refrigerator lying on the side. Typically, the refrigerator may be shipped in a box, which may have a rectangular shape designed to accommodate the rectangular shape of the refrigerator. In these cases, the box may be positioned in an upright position (e.g., in which the longer length of the box may run vertically), or may be positioned in a prone-lying position (e.g., in which the longer length of the box may run horizontally). In a similar manner, many products, such as beds, long furniture, etc., may have an upright orientation and/or a prone-lying orientation. This is typically the case where the product is shipped or packaged in a rectangular or non-cubical box, but may also include cubical boxes in some cases.

It has been found, however, that transporting products in a prone-lying position allows a higher number of units to be transported per load, especially when the products include large or long products. As a result, long products are typically transported and arrive at the warehouses in a prone-lying position. However, despite the advantages of transporting products in a prone-lying position, this presents a problem, as these long products are preferably stored in the warehouse in an upright position. For example, some products are recommended to the stored medium to long term in an upright position, and in most cases, moving long products within a warehouse is much easier in the upright position. In addition, when presenting the products to a consumer, the product is better presented in an upright position. As a result, upon arrival at the warehouse in the prone-lying position, these products are then raised, moved, or otherwise positioned into the upright position.

In most cases, positioning a product into an upright position may be done manually, by a human worker physically lifting the product (e.g., picking up an end of the box or product and using their strength to lift the object) into the upright position. This process, however, is fraught with peril. For example, the human worker may fail to fully lift the product, and may drop the product, which may cause damage to the unit or, even worse, may hurt the worker. In addition, this is a slow process, as the process must be done with care to avoid problems. As a result, the advantages of transporting products in a prone-lying position may be somewhat diminished by the difficult manual process in current practice to position the products into an upright position once the products arrive at their destination.

SUMMARY

The present disclosure achieves technical advantages as an apparatus, system, and method for the translation and rotation of an object to position the object into an upright position. In embodiments, an apparatus for positioning objects into an upright position may include a baseplate configured to attach to a clamping and lifting system, a surface plate, and a rotator configured to rotatably connect the surface plate to the base plate such that the surface plate is able to rotate independently of the base plate about an axis normal to the base plate.

In embodiments, positioning the object into the upright position may include positioning the surface plate of a first apparatus against a proximate end of the object while the object is in a prone-lying position. The clamping and lifting system may be used to apply a clamping force against the object which may cause the surface plate to press against the proximate end of the object, thereby securing the object to the apparatus. In some embodiments, a second apparatus may be positioned against the other side of the proximate end of the object to facilitate the clamping action against the object while allow the rotation of the object. The clamping and lifting system may then be used to apply a lifting force, which may cause the base plate, and the surface plate attached thereto, to rise vertically upwards. As the apparatus rises, the surface plate pressed against the proximate end of the object may pull the proximate end of the object vertically upwards, causing the proximate end of the object to lift. As a distal end of the object is not being raised, and as the proximal end of the object is being raised vertically upwards by the surface plate, the lifting of the proximate end of the object vertically upwards can cause the proximate end of the object to experience a rotational force due to the weight of the distal end of the object creating a lever against the proximate end. In embodiments, the surface plate configuration may allow the surface plate and the proximate end of the object to rotate around about an axis normal to the base plate, while the distal end of the object is pulled to a location under the surface plate and the proximate end. This action may continue until the object is raised fully vertically upwards (e.g., until the object is raised off the ground or floor) at which point the distal end of the object may be at a location under the surface plate and the proximate end, which may be upright position. The clamping and lifting system may then be used to lower the apparatus until the object is standing up on the ground or floor in the upright position.

In embodiments, the apparatus for positioning objects into an upright position implemented in accordance with embodiments of the present disclosure can provide a solution to the current issues related to positioning objects into the upright position, as described above. For example, the apparatuses, systems, and methods of embodiments may provide a solution that may mitigate or eliminate the problems associated with manually lifting or standing up objects into the upright position. In embodiments, the apparatus for positioning objects into an upright position implemented in accordance with embodiments of the present disclosure may provide a straight-forward, simplified, low maintenance, and low-cost solution for solving the problems associated with manually lifting or standing up objects into the upright position. Advantageously, in some embodiments, the apparatus provides the technological benefit of repositioning objects without the use of complicated, expensive machinery, using only the weight of the object to rotate the object. In come embodiments, the apparatus can be removably attached to a clamp vehicle to not require a dedicated machine. In other embodiments, the apparatus can be integrated with one or more clamp blades of a clamp machine.

In embodiments, in operation, a first apparatus can be removably coupled to a first clamp blade of a clamp vehicle and a second apparatus can be removably coupled to a second clamp blade of a clamp vehicle. The clamp vehicle can position at least a portion of a first end of an object between the first and second apparatus and the first and second clamp blades of the clamp vehicle can close such that at least a portion of the first end of the object is compressed without damage to the object. The clamp vehicle can then raise the first and second clamp blades, allowing the object and at least a portion of the apparatus to rotate. For example, as only a portion of the first end is being raised, the weight of the second end of the object causes the at least portion of the apparatus to rotate and can hang from between the first and second clamp blades, translating and rotating the object into an upright position (e.g., perpendicular to its original orientation, at an angle to its original position, etc.). The clamp vehicle can then lower the first and second clamp blades, allowing the object to rest in the upright position on a surface (e.g., ground, platform, etc.). The first and second clamp blades of the clamp vehicle can open, releasing the object. In this way, any object can be translated and/or rotated to change the orientation of the object. The apparatus provides the significant benefit of providing a low cost, non-labor-intensive process for rotating objects to conserve shipping space, resulting in substantial cost savings.

It is an object of the invention to provide an apparatus for positioning an object into an upright position. It is a further object of the invention to provide a system for positioning an object into an upright position, and a method of positioning an object into an upright position. These and other objects are provided by at least the following embodiments.

In one embodiment, an apparatus for positioning an object into an upright position is provided. The apparatus includes a base plate configured to attach to a clamp vehicle, and a surface plate rotatably connected to the base plate. In embodiments, the surface plate is configured to contact the object and to apply a pressure against the object creating a frictional contact. The apparatus also includes a rotator configured to rotatably connect the surface plate to the base plate. In embodiments, the rotator facilitates the surface plate to rotate independently of the base plate about an axis normal to the base plate when a rotational force is applied against the surface plate by a rotation of the object due to the frictional contact between the object and the surface plate, and the surface plate is configured to lift and rotate the object into the upright position in response to the clamp vehicle raising the base plate.

In another embodiment, the apparatus for positioning an object into an upright position can include: a base plate configured to operably couple to a lifting device; a surface plate rotatably coupled to the base plate, wherein the surface plate is configured to apply a force against at least a portion of the object; and a rotator configured to rotatably connect the surface plate to the base plate, wherein the rotator allows the surface plate to independently rotate about an axis of the base plate when a rotational force is applied to the surface plate by a rotation of the object, wherein the surface plate is configured to lift and rotate the object into the upright position in response to the lifting device raising the base plate. Wherein the lifting device can be clamp vehicle. Wherein the rotator can include a first component fixedly attached to the base plate and a second component fixedly attached to the surface plate. Wherein the rotator includes a bearing connecting the first component of the rotator to the second component of the rotator and allows the second component of the rotator to rotate about an axis of the first component of the rotator. Further comprising a speed controller configured to apply a resistance against the surface plate to limit the rotation of the surface plate in a first direction due to a rotation the object and restrain a speed of the rotation of the surface plate in the first direction. Wherein the speed controller is configured to rotatably retract the surface plate to a starting position of the surface plate. Further comprising a rotation stopper configured to prevent further rotation of the surface plate beyond a threshold amount of rotation from a starting position of the surface plate. Wherein the rotation stopper includes a first stopper component fixedly attached to the base plate at a first location and a second stopper component fixedly attached to the surface plate at a second location, and wherein the first location of the first stopper component and the second location of the second stopper component are configured such that the first component and the second are not in contact at the starting position of the surface plate and such that the first component and the second are in contact when the rotation of the surface plate reaches the threshold amount of rotation from the starting position of the surface plate. Wherein the surface plate includes a surface liner disposed on a top surface of the surface plate.

In another embodiment, a system for positioning an object into an upright position is provided. The system includes a first base plate configured to attach to a first clamp blade of a clamp vehicle and a second base plate configured to attach to a second clamp blade of the clamp vehicle. The system also includes a first surface plate rotatably connected to the first base plate. In embodiments, the first surface plate is configured to contact a first side of the object. The system also includes a second surface plate rotatably connected to the second base plate. In embodiments, the second surface plate is configured to contact a second side of the object, and the first surface plate and the second surface plate clamp the object in response to the clamp vehicle applying a clamping force. In embodiments, the clamping by the first surface plate and the second surface plate causes the object to be lifted and rotated into the upright position in response to the clamp vehicle raising the first clamp blade and the second clamp blade.

In another embodiment, a system for positioning an object into an upright position can include: a clamp vehicle having a first clamp blade and a second clamp blade, wherein the clamp vehicle is operable to provide a compressive force between the first clamp blade and the second clamp blade; a first base plate operably coupled to the first clamp blade of the clamp vehicle; a second base plate operably coupled to the second clamp blade of the clamp vehicle; a first surface plate rotatably coupled to the first base plate, wherein the first surface plate is configured to contact a first portion of an object; and a second surface plate rotatably coupled to the second base plate, wherein the second surface plate is configured to contact a second portion of the object in a first position, wherein the first surface plate and the second surface plate compress the object in response to the clamp vehicle applying a compressive force, wherein the system is configurable to lift at least a portion of the object compressed between the first surface plate and the second surface plate via the clamp vehicle and rotate the object into a second position via the first surface plate and the second surface plate.

In another embodiment, a method of positioning an object into an upright position is provided. The method includes positioning a first surface plate rotatably connected to a first base plate against a first side of a first end of the object. In embodiments, the object is currently in a prone-lying position on a surface, and the first base plate is attached to a first clamp blade of a clamp vehicle. The method also includes positioning a second surface plate rotatably connected to a second base plate against a second side of the first end of the object. In embodiments, the second base plate is attached to a second clamp blade of the clamp vehicle. The method further includes clamping the object against the first surface plate and the second surface plate, and raising the first clamp blade and the second clamp blade. In embodiments, raising the first clamp blade and the second clamp blade causes the first end of the object to be lifted and to rotate toward the upright position with respect to a second end of the object, the second end of the object to slide in a direction toward the clamp vehicle, and the first surface plate and the second surface plate to rotate in response to the rotation of the first end of the object. The method also includes continuing to raise the first clamp blade and the second clamp blade until the object is rotated into the upright position, and lowering the first clamp blade and the second clamp blade to position the object into the upright position on the surface.

In still another embodiment, a method of manufacturing an apparatus for positioning an object into an upright position is provided. The method includes configuring a base plate to attach to a clamp vehicle, and rotatably connecting a surface plate to the base plate. In embodiments, the surface plate is configured to contact the object and to apply a pressure against the object creating a frictional contact. The method also includes configuring a rotator to rotatably connect the surface plate to the base plate. In embodiments, the rotator facilitates the surface plate to rotate independently of the base plate about an axis normal to the base plate when a rotational force is applied against the surface plate by a rotation of the object due to the frictional contact between the object and the surface plate, and the surface plate is configured to lift and rotate the object into the upright position in response to the clamp vehicle raising the base plate.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. A patent examiner, after having obtained a thorough understanding of the disclosure and claims of the present application has searched the prior art as disclosed in patents and other published documents, e.g., non-patent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Figure 1:
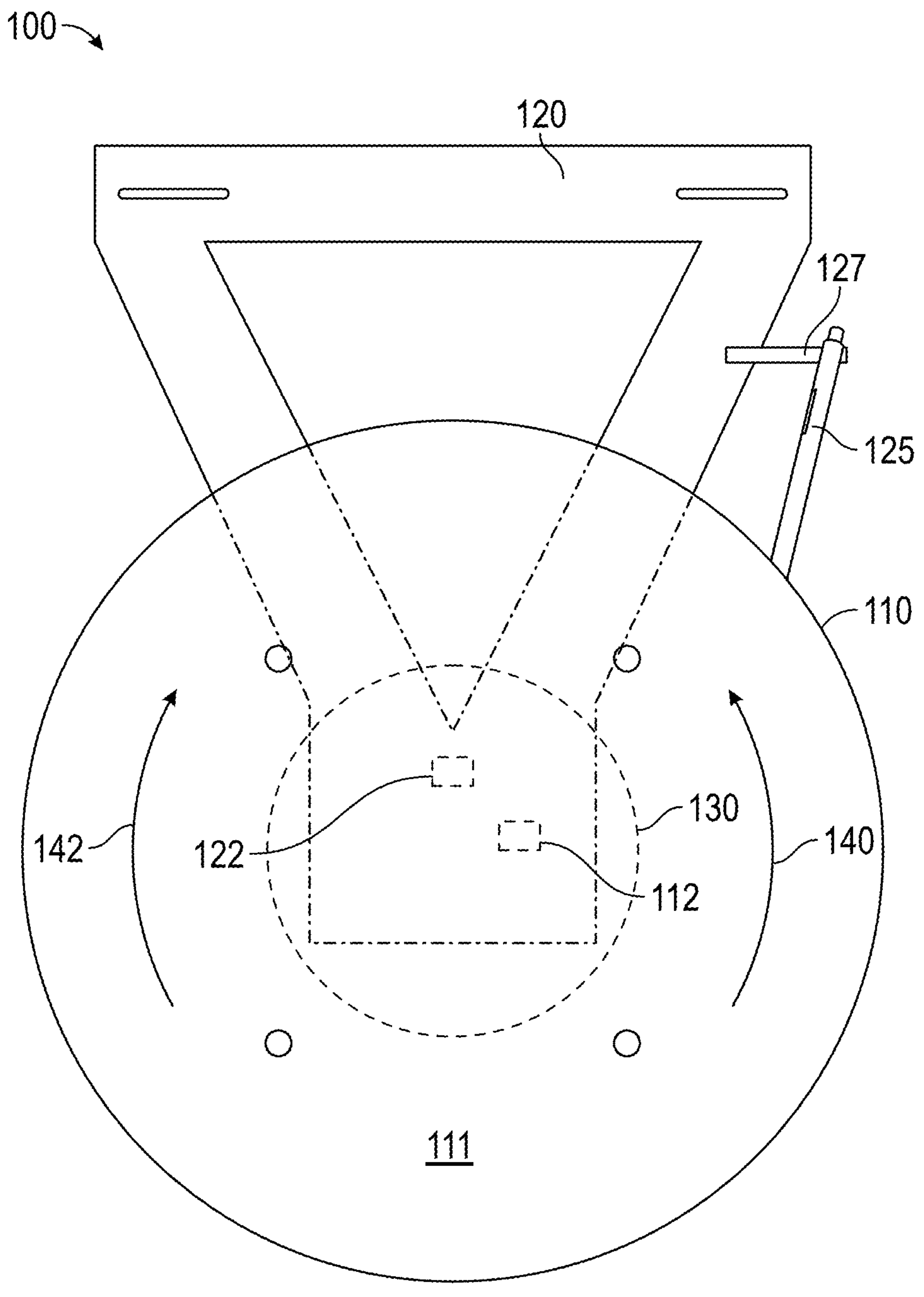
FIG. 1 shows an exemplary apparatus configured with capabilities and functionality for positioning an object into an upright position in accordance with embodiments of the present disclosure.

Various embodiments of the present disclosure are directed to an apparatus configured for positioning objects into an upright position. FIG. 1 shows an exemplary apparatus 100 configured with capabilities and functionality for positioning an object into an upright position in accordance with embodiments of the present disclosure. As shown in FIG. 1, apparatus 100 may include surface plate 110, base plate 120, and rotator 130. In embodiments, the various components of apparatus 100 may be configured to provide functionality, such as by the cooperative operation of the various components of apparatus 100, to position an object into an upright position, as described in various embodiments of the present disclosure.

For example, in embodiments, rotator 130 may be configured to rotatably connect surface plate 110 to base plate 120. In embodiments, the rotatable connection between surface plate 110 and base plate 120 may allow surface plate 110 to rotate independently of base plate 120 about an axis (e.g., normal to the base plate). For example, the surface plate 110 can rotate independently of base plate 120 in counterclockwise direction 140 and/or clockwise direction 142. In embodiments, during operations, base plate 120 may be fixedly attached to a clamping and lifting system (e.g., a clamp vehicle not shown), and surface plate 110 may be positioned against a surface of a proximate end of an object currently in a prone-lying position. The base plate 120 can be made of metal, plastic, Kevlar®, carbon fiber, a metal alloy or other suitable material. In one embodiment, the base plate 120 can be sized and shaped to reduce its weight. For example, the base plate 120 can take a triangular or "Y" shape, have openings disposed within its perimeter, or any suitable combination thereof. A compressive force (e.g., clamping force) may press surface plate 110 against the proximate end of the object, and a lifting force subsequently applied (e.g., by the clamping and lifting system) may cause the proximate end of the object to rise vertically upwards (e.g., by surface plate 110 pulling the proximate end of the object vertically upwards). The vertically upwards lifting of the proximate end of the object may cause the distal end of the object (which may not be lifted) to slide in a direction toward a position under the proximate end, and the proximate end may experience a rotational force due to the weight of the distal end of the object creating a lever against the proximate end. In embodiments, surface plate 110's configuration may allow surface plate 110 and the proximate end of the object to rotate around about an axis normal to base plate 120 as the distal end of the object slides toward the location under the proximate end. This action may continue until the object is fully raised at which point the distal end of the object may be at the location under the proximate end, which may be the upright position. The object may then be lowered onto the ground, floor, ramp, truck, shipping container, or other suitable surface, such that the object may be standing up on the ground or floor in the upright position.

In embodiments, an object may include a product or group of products, a shipping box, a shipping container, and/or any other object that may be positioned into an upright position. For example, an object may include a large or long object, that may have a prone-lying orientation and an upright orientation and/or may include a generally rectangular-shaped object, such as a shipping container, a shipping box, etc.

Base plate 120 may be configured to provide structural support for apparatus 100, such as by providing functionality for attaching the various component for apparatus 100. For example, base plate 120 may be configured to rotatably attach to surface plate 110 and to attach to a clamping and lifting system. The configuration and functionality of base plate 120 will now be discussed with reference to FIG. 2.

Figure 2:
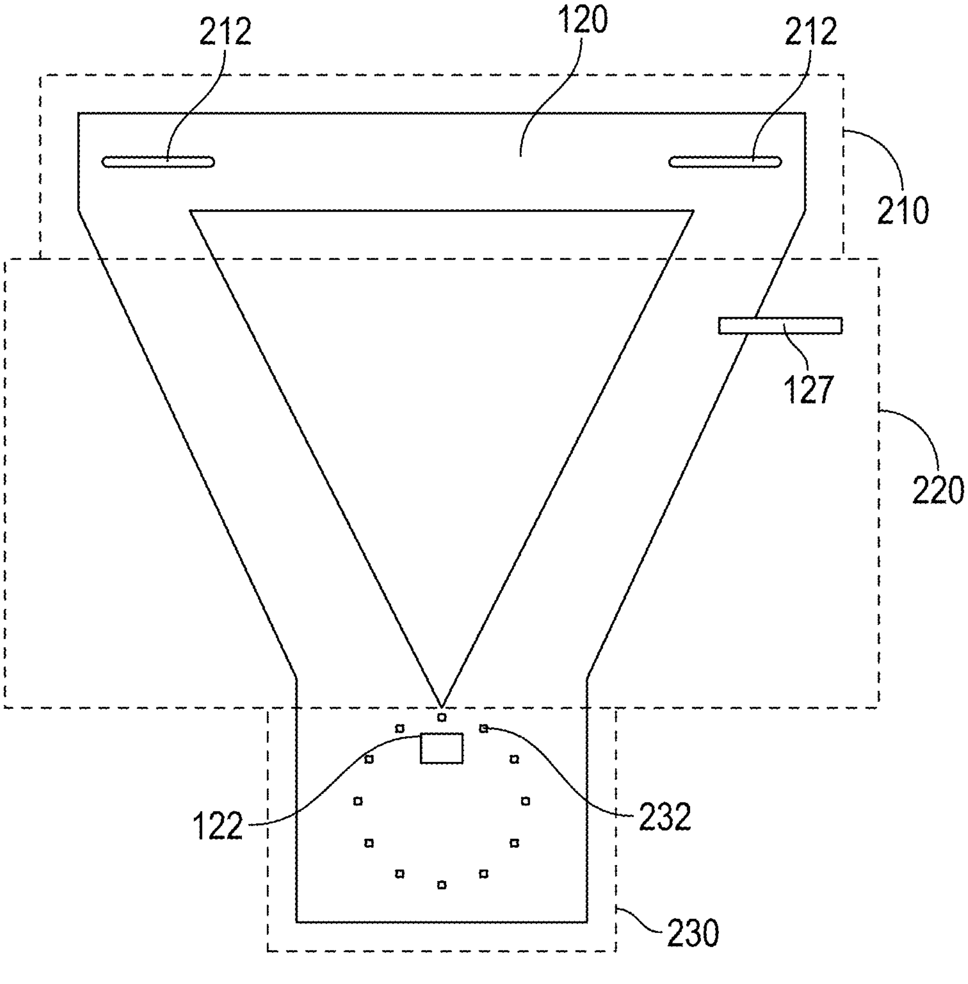
FIG. 2 shows an exemplary base plate configured with capabilities and functionality in accordance with embodiments of the present disclosure.

FIG. 2 shows an exemplary base plate 120 configured with capabilities and functionality in accordance with embodiments of the present disclosure. As shown in FIG. 2, base plate 120 may include section 210, section 220, and section 230. In embodiments, section 210 may be configured to attach to a lifting device (e.g., a clamp vehicle, such as a clam truck, not shown). In embodiments, the base plate 120 can include a angled or curved edge to couple the base plate 120 to the lifting device. In this way the base plate 120 can be hooked onto the top edge of a clamp blade. In embodiments, section 210 may include one or more mounting holes 212 that may be configured to receive one or more mounting bolts or screws (not shown in FIG. 2) to securely attach section 210 (and base plate 120) to the clamping and lifting system. In embodiments, mounting holes 212 may be sized to receive the mounting bolts. In some embodiments, mounting holes 212 may be configured to be adjustable (e.g., in an oblong shape) such that the mounting holes 212 may be accessed at multiple points within mounting holes 212. In this manner, the configuration of mounting holes 212 may accommodate deviations in the location of the mounting bolt or screw from different clamping and lifting systems by nature of being oblong.

In embodiments, section 220 may be configured to provide structural support for base plate 210, and/or to connect sections 210 to section 230. In embodiments, section 220 may be configured in a Y-shape to provide support while reducing the materials used and the weight of base plate 220. In some embodiments, section 220 may be configured to provide an attachment arm 127 for speed controller 125, as will be described in more detail below.

In embodiments, section 230 may be configured to provide an attachment point or area for surface plate 110. As will be described in more detail below, surface plate 110 may be rotatably attached (e.g., via rotator 130) to base plate 120. In embodiments, section 232 may include one or more mounting holes 232 configured to receive a mounting bolt to securely attach at least a portion of rotator 130, which may be connected to surface plate 110, thereby providing the rotatable connection between base plate 120 and surface plate 110.

In some embodiments, section 130 may include a first stopper component 122 of a rotation stopper configured to stop or resist rotation of surface plate 110, as will be described in more detail below.

Figure 3A:
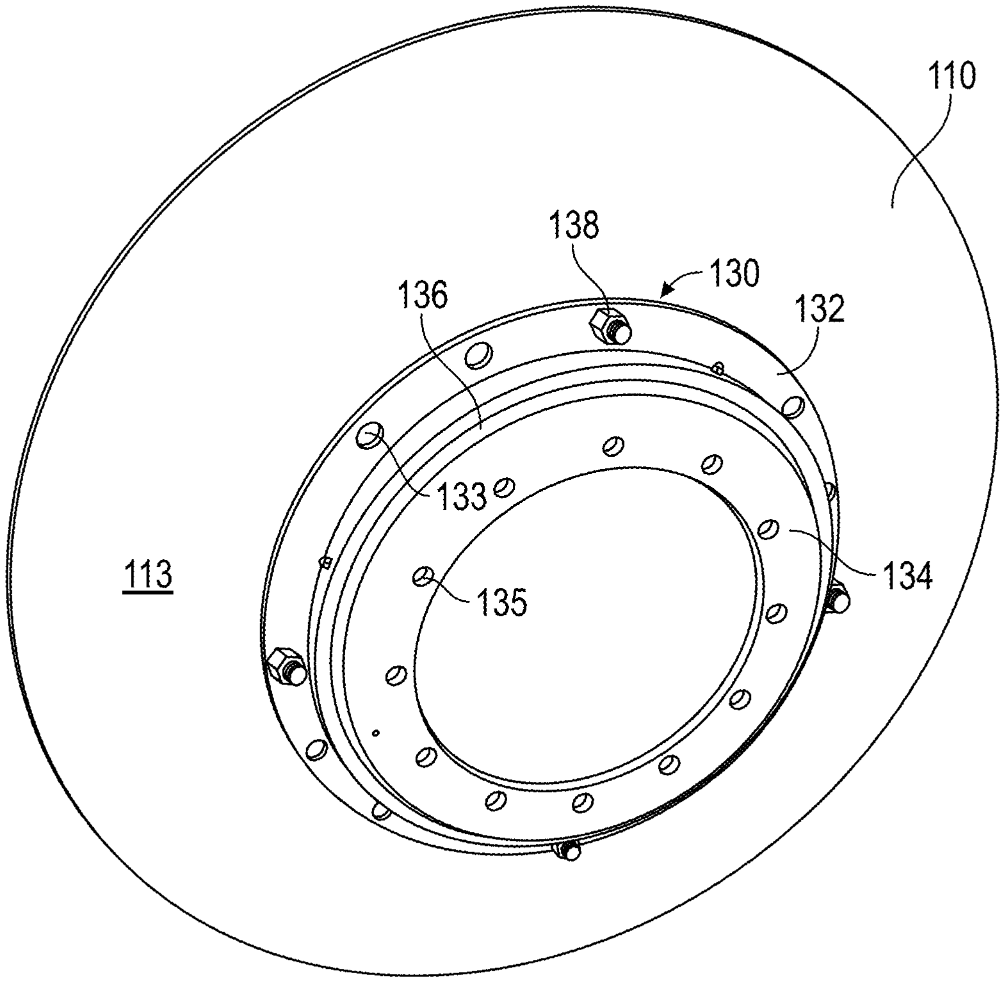
FIGS. 3A and 3B show an exemplary surface plate configured with capabilities and functionality in accordance with embodiments of the present disclosure.
Figure 3B:
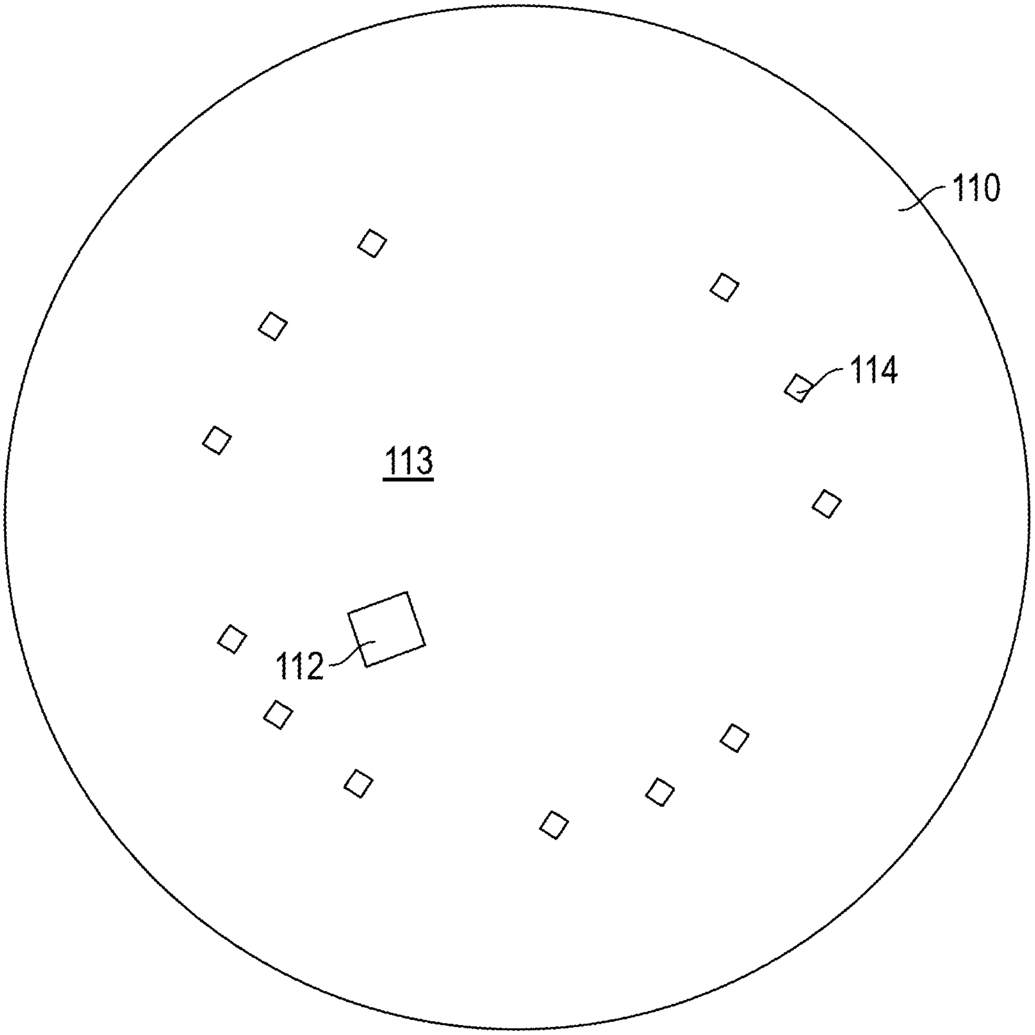

With reference back to FIG. 1, surface plate 110 may be connected or attached to base plate 120 using rotator 130. In embodiments, surface plate 110 may be configured to contact the object to be positioned upright and to press against the object in response to a clamping force applied to surface plate 110 (e.g., using the clamping and lifting system not shown in FIG. 1). Surface plate 110 may be configured to securely hold the object in response to the clamping force exerted against the object (e.g., due to friction) while allowing rotation of the object with respect to base plate 120. The configuration and functionality of surface plate 110 will now be discussed with additional reference to FIGS. 3A and 3B. FIGS. 3A and 3B show an exemplary surface plate 110 configured with capabilities and functionality in accordance with embodiments of the present disclosure.

In embodiments, surface plate 110 may include a top surface 111 and a bottom surface 113. Top surface 111, as shown in FIG. 1, may be configured to contact the object during operation. In some embodiments, top surface 111 may include a surface liner that may be positioned over top surface 111 and that may be configured to provide an enhanced grip against the object and/or to protect the object from damage due to the contact with surface plate 110. In embodiments, the surface liner may be constructed or soft plastic, rubber, foam, and/or any other material in accordance with operational requirements.

In embodiments, bottom surface 113 of surface plate 110 may be configured to rotatably connect to base plate 120 using rotator 130. For example, as shown in FIG. 3B, bottom surface 113 may include one or more mounting holes 114 configured to receive a mounting bolt or screw to securely attach surface plate 110 to rotator 130 (which may also be connected to base plate 120, thereby providing the rotatable connection between base plate 120 and surface plate 110). FIG. 3A shows how rotator 130 may be connected (e.g., using one or more mounting bolts 138) to surface plate 110. In particular, rotator 130 may include one or more mounting holes 133 that may align with one or more of the mounting holes 114 of surface plate 110. A mounting bolt 138 may be used through mounting holes 133 of rotator 130 and mounting holes 114 of surface plate 110 to securely attach surface plate 110 to rotator 130. As described in more detail below, rotator 130 may also be attached to base plate 120. In this manner, rotator 130 may be used to rotatably connect surface plate 110 to base plate 120. In embodiments, the rotatable connection between surface plate 110 and base plate 120 may allow surface plate 110 to rotate independently from base plate 120, and indeed to rotate with respect to base plate 120 about an axis normal to base plate 120. For example, with respect to FIG. 1, surface plate 110 may rotate in counterclockwise direction 140 and/or clockwise direction 142 with respect to base plate 120.

In embodiments, as shown in FIG. 3B, section 130 may include second stopper component 112 of the rotation stopper configured to stop or resist rotation of surface plate 110 with respect to base plate 120, as will be described in more detail below. In embodiments, second stopper component 112 may include a stopper of a soft material, such as rubber to absorb the shock as second stopper component 112 may contact first stopper component 122, as described below.

Figure 4:
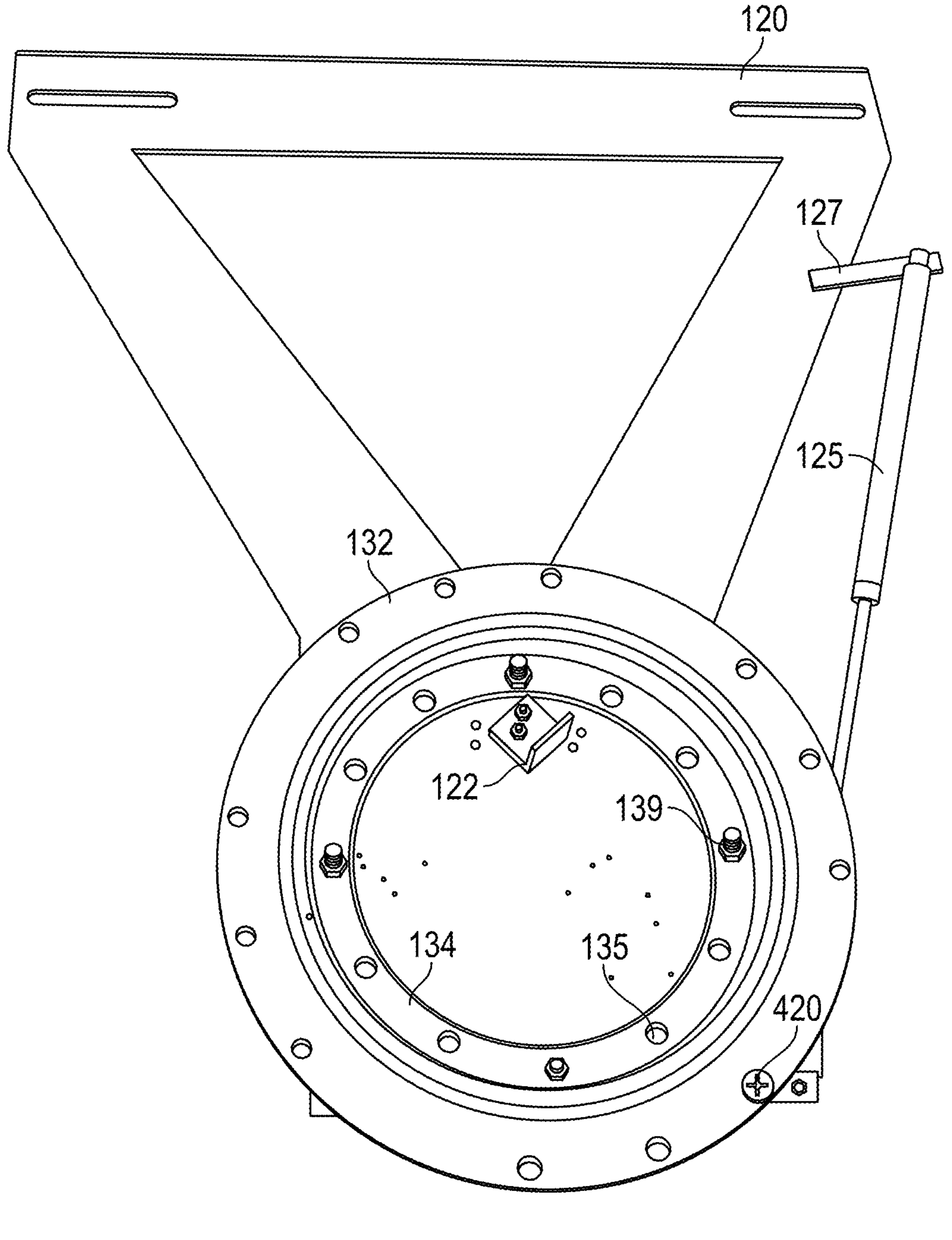
FIG. 4 shows an exemplary rotator configured with capabilities and functionality in accordance with embodiments of the present disclosure.

With reference back to FIG. 1, rotator 130 may be configured to rotatably connect surface plate 110 to base plate 120. In embodiments, rotator 130 may be securely connected to both base plate 120 and surface plate 110, and may allow surface plate 110 to rotate independently from and with respect to base plate 120 about an axis normal to base plate 120. In embodiments, such as during operations of apparatus 100, base plate 120 may be securely attached to a lifting and clamping system (e.g., a clamp vehicle) in which case rotator 130 may allow surface plate 110 to rotate independently from the lifting and clamping system. The configuration and functionality of rotator 130 will now be discussed with additional reference to FIGS. 3A and 4. FIG. 4 shows an exemplary rotator 130 configured with capabilities and functionality in accordance with embodiments of the present disclosure.

As shown in FIG. 1, rotator 130 may be disposed between surface plate 110 and base plate 120, and may rotatably connect surface plate 110 to base plate 120. In embodiments, the rotatable connection between surface plate 110 and base plate 120 may allow surface plate 110 to rotate in counterclockwise direction 140 and/or clockwise direction 142 while base plate 120 may remain fixed. In embodiments, the functionality of rotator 130 to rotatably connect surface plate 110 to base plate 120 may be implemented by one or more components of rotator 130.

For example, as shown in FIG. 3A and FIG. 4, rotator 130 may include first component 132, second component 134, and bearing component 136. In embodiments, bearing component 136 may be configured to attach first component 132 to second component 134, while allowing first component 132 and second component 134 to rotate with respect to each other, independently of each other. In embodiments, bearing component 136 may include a bearing, and/or any other component that may facilitate a rotatable connection between first component 132 and second component 134 allowing the components to rotate with respect to each other and independently of each other, while remaining attached to each other.

In embodiments, as shown in FIG. 3A, first component 132 may be configured to securely attach to bottom surface 113 of surface plate 110. In embodiments, first component 132 may include one or more mounting holes 133 configured to receive one or more mounting bolts 138. In embodiments, first component 132 may be securely attached to bottom surface 113 of surface plate 110 by aligning one or more of the mounting holes 133 of first component 132 with one or more of the mounting holes 114 of surface plate 110. Once aligned, a mounting bolt 138 may be inserted through one or more of the aligned mounting holes 133 and mounting holes 114 to securely attach surface plate 110 to first component 132. It is noted that mounting bolts 138 may include bolts, screws, and/or any other type of fastener configured to securely attach surface plate 110 to first component 132 and the description herein of a bolt should not be construed as limiting in any way.

In embodiments, as shown in FIG. 4, second component 134 may be configured to securely attach to base plate 120. In embodiments, second component 134 may include one or more mounting holes 135 configured to receive one or more mounting bolts 139. In embodiments, second component 134 may be securely attached to base plate 120 by aligning one or more of the mounting holes 135 of second component 134 with one or more of the mounting holes 232 of base plate 120 (e.g., mounting holes 232 of section 230 as shown in FIG. 2). Once aligned, a mounting bolt 139 may be inserted through one or more of the aligned mounting holes 135 to securely attach base plate 120 to second component 134. It is noted that mounting bolts 139 may include bolts, screws, and/or any other type of fastener configured to securely attach base plate 120 to second component 134 and the description herein of a bolt should not be construed as limiting in any way.

In this manner, rotator 130 may be securely connected to both base plate 120 and surface plate 110, and may allow surface plate 110 to rotate independently from and with respect to base plate 120 about an axis normal to base plate 120.

With reference back to FIG. 1, in some embodiments, apparatus 100 may include one or more speed controller 125. In embodiments, speed controller 125 may be configured to provide a mechanism for controlling the speed of the rotation of surface plate 110. In some embodiments, speed controller 125 may be configured to provide a mechanism for returning the position of surface plate 110 to an initial position.

For example, in embodiments, speed controller 125 may include a piston, a spring, a strut, and/or any other component that may provide resistance to a longitudinal compression (e.g., in the direction of the rotation of surface plate 110). In embodiments, speed controller 125 may be connected between attachment arm 127 of base plate 120 and rotator 130. In particular, as shown in FIG. 4, a first end of speed controller 125 may be connected to attachment arm 127 of base plate 120 and a second end of speed controller 125 may be connected to first component 132 of rotator 130. As described above, first component 132 of rotator 130 may be fixedly or securely attached to surface plate 110. In this manner, rotation of surface plate 110 in counterclockwise direction 140 may cause a longitudinal compression force to be applied against speed controller 125. Speed controller 125 may be configured to resist the longitudinal compression which may cause the counterclockwise rotation of surface plate 110 to be resisted and slowed down, and/or controlled. The amount of resistance to the counterclockwise rotation of surface plate 110 that may be provided by speed controller 125 may depend on the configuration of speed controller 125, and may be based on operational requirements.

In embodiments, the connection between speed controller 125 and first component 132 of rotator 130 may create a natural default state, when no rotational force is applied to surface plate 110 connected to first component 132 of rotator 130. This natural or default state may be a starting position for surface plate 110, as this may be the position of surface plate 110 when no forces are applied to surface plate 110. In particular, speed controller 125 may cause, after surface plate 110 has been rotated during operations, surface plate 110 to rotate back to the starting position when the rotation forces are removed (e.g., when the object is released from surface plate 110).

In some embodiments, speed controller 125 may be excluded form apparatus 100. For example, in some embodiments, more than one apparatus 100 may be used during operations to clamp an object in a prone-lying position. In these embodiments, a first apparatus 100 may be positioned on one side of the proximal end of the object and a second apparatus 100 may be positioned on the other side of the proximal end of the object. The first and second apparatus 100 may then be used to clamp (e.g., to squeeze) and to rotate the object into the upright position. In these embodiments, the rotation of the object as it is lifted and positioned into the upright positions may be controlled (e.g., slowed or resisted) using speed controller 125, but may be included in only one of the first and second apparatus 100, not on both. In this manner, the design and configuration of a system for positioning and object into the upright position may be simplified by excluding the speed controller 125 from all but one of the apparatuses 100 used to stand up the object.

In embodiments, apparatus 100 may include a rotation stopper mechanism. In embodiments, the rotation stopper mechanism may be configured to provide a mechanism for stopping or preventing further rotation of surface plate 110 beyond a threshold amount of rotation from the starting position of surface plate 110. For example, in embodiments, positioning an object from a current prone-lying position into an upright position may typically require rotating the object approximately ninety degrees into the upright position. In embodiments, the rotation stopper mechanism of apparatus 100 may be configured to prevent over rotation of the object to prevent potential damage or injury by providing a mechanism to stop or resist further rotation beyond the rotation threshold (e.g., beyond ninety degrees of rotation).

In embodiments, the rotation stopper mechanism may include two stopper components. For example, the rotation stopper mechanism may include first stopper component 122 and second stopper component 112. In embodiments, as shown in FIG. 2, first stopper component 122 may be fixedly attached to base plate 120. In particular, first stopper component 122 may be fixedly attached to section 230 of base plate 120, which may be the section to which rotator 130 may be attached, ensuring in this manner that first stopper component 122 may be located near second stopper component 112 attached to bottom surface 113 of surface plate 110. In embodiments, as shown in FIG. 3B, second stopper component 112 may be fixedly attached to bottom surface 113 of surface plate 110. In embodiments, second stopper component 112 may include a stopper of a soft material, such as rubber to absorb the shock as second stopper component 112 may contact first stopper component 122.

In embodiments, as shown in FIG. 11, the location of first stopper component 122 and second stopper component 112 may be configured to ensure that second stopper component 112 makes contact with first stopper component 122 after rotation of surface plate 110 has reached the rotation threshold. For example, during operations, surface plate 110 may rotate in a particular direction depending on the orientation of apparatus 100 with respect to the object to the positioned upright. In some embodiments, apparatus 100 may be positioned against the object in such a way that lifting the object causes a counterclockwise rotation of surface plate 110. In some embodiments, apparatus 100 may be positioned against the object in such a way that lifting the object causes a clockwise rotation of surface plate 110. In the particular example illustrated in FIG. 1, apparatus 100 may be against the object in such a way that lifting the object causes a counterclockwise rotation of surface plate 110. In this case, as surface plate 110 rotates counterclockwise, second stopper component 112, which may be securely and/or fixedly attached to the bottom surface of surface plate 110 may be moved in the direction of the rotation of surface plate 110, which in this case may cause second stopper component 112 to move toward first stopper component 122. Upon reaching the rotation threshold (e.g., after surface plate 110 has rotated ninety degrees in the counterclockwise direction), second stopper component 112 may contact first stopper component 122. As first stopper component 122 is fixedly attached to base plate 120, which may not be rotating, the rotation of surface plate 110 may be stopped and further rotation of surface plate 110 may be prevented by the contact between second stopper component 112 and first stopper component 122.

In some embodiments, the rotation threshold for surface plate 110 may depend on the location of second stopper component 112 and/or first stopper component 122. In embodiments, the rotation threshold may be configured by positioning the second stopper component 112 and/or first stopper component 122 with a separation equal to the rotation threshold. For example, configuring a rotation threshold of ninety degrees may include positioning the second stopper component 112 and first stopper component 122 with a separation of ninety degrees of rotation.

Figure 5A:
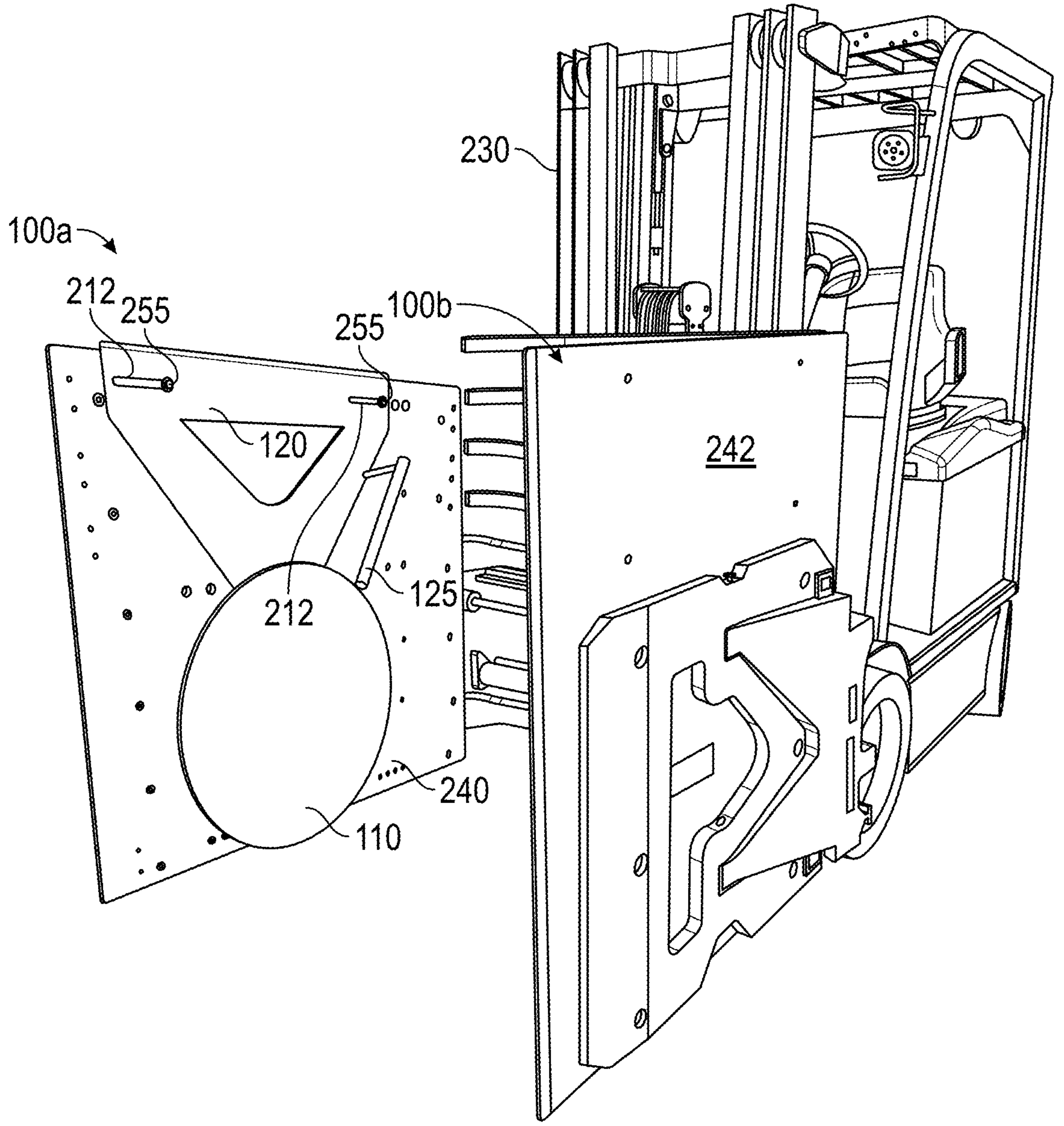
FIGS. 5A and 5B show an example configuration of an installation of one or more apparatus configured for positioning objects into an upright position in accordance with embodiments of the present disclosure.
Figure 5B:
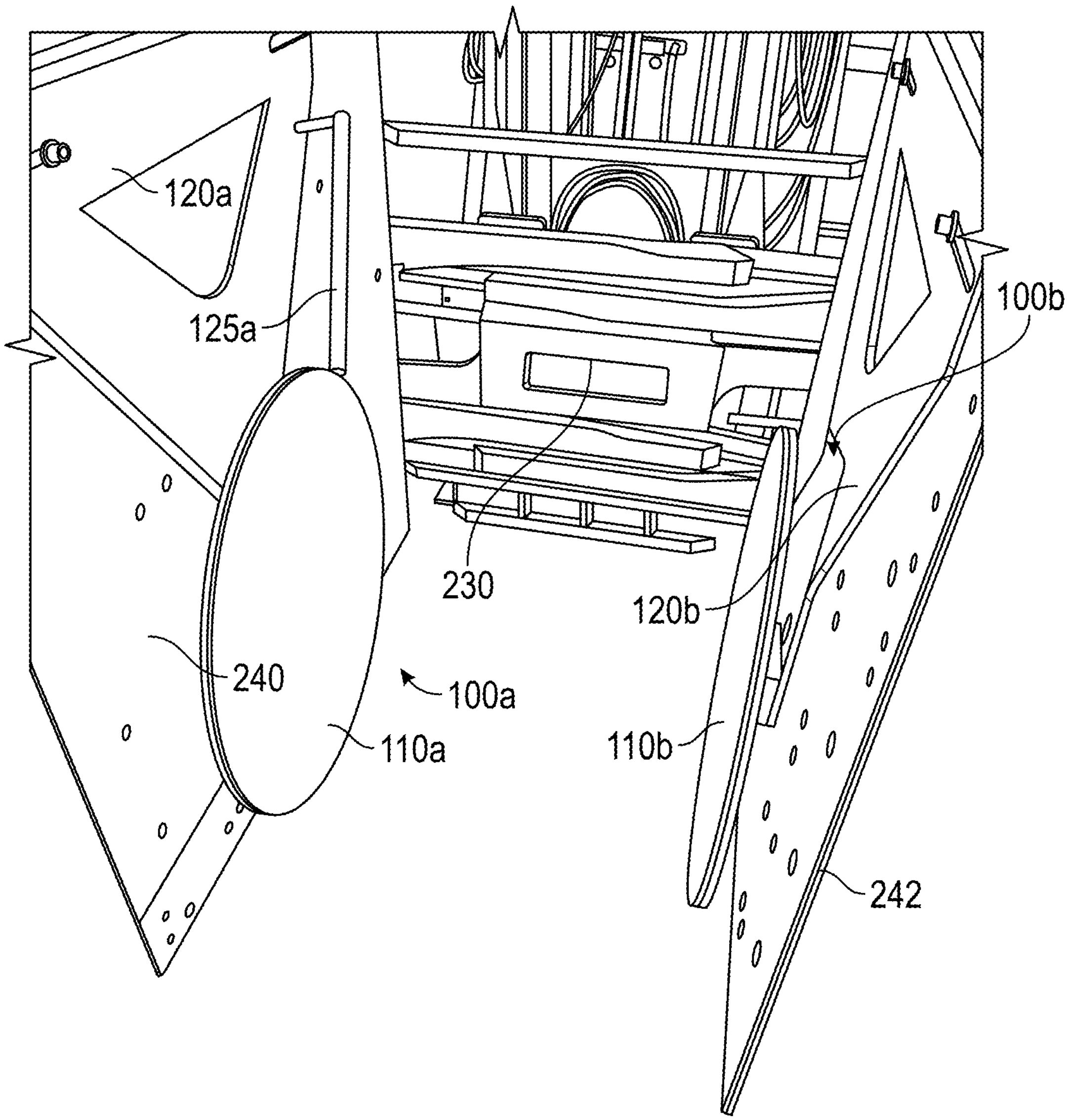

FIGS. 5A and 5B show an example configuration of an installation of one or more apparatus 100 configured for positioning objects into an upright position in accordance with embodiments of the present disclosure. In embodiments, one or more apparatus 100 may be used during operations. In particular, in some embodiments, more than one apparatuses 100 may be used to clamp an object currently in a prone-lying position to be positioned in the upright position. In these embodiments, a first apparatus 100*a* may be installed onto clamp vehicle 230. In embodiments, clamp vehicle 230 may be a clamping and lifting mechanism configured to apply a clamping force against the object to be positioned upright, and to provide a lifting force through apparatus 100*a* (and 110*b*) to lift the object vertically upwards. In particular, clamp vehicle 230 may include two clamp arms, namely right clamp arm 240 and left clamp arm 242.

In embodiments, first apparatus 100*a* may be installed onto right clamp arm 240 of clamp vehicle 230 and second apparatus 100*b* may be installed onto left clamp arm 242 of clamp vehicle 230. In particular, first apparatus 100*a* and second apparatus 100*b* may be installed onto the respective clamp arm of clamp vehicle 230 by attaching the respective base plate to the corresponding clamp arm. For example, first apparatus 100*a* may be installed onto right clamp arm 240 of clamp vehicle 230 by securely attaching base plate 120 of first apparatus 100*a* onto right clamp arm 240 using one or more mounting bolts 255 through one or more mounting holes 212 of base plate 120 of first apparatus 100*a*. Similarly, second apparatus 100*b* may be installed onto left clamp arm 242 of clamp vehicle 230 by securely attaching base plate 120 of second apparatus 100*b* onto left clamp arm 242 using one or more mounting bolts through one or more mounting holes of base plate 120 of second apparatus 100*b*.

The result is that first apparatus 100*a* may be installed onto right clamp arm 240 of clamp vehicle 230 and second apparatus 100*b* may be installed onto left clamp arm 242 of clamp vehicle 230, as shown in FIG. 5B. In embodiments, during operations, first apparatus 100*a* may be positioned on one side of the proximal end of the object and second apparatus 100*b* may be positioned on the other side of the proximal end of the object. First apparatus 100*a* and second apparatus 100*b* may then be used to clamp (e.g., to squeeze) the object and to rotate the object into the upright position. As shown in FIG. 5B, each clamp arm of clamp vehicle 230 may include an apparatus 100 configured in accordance with embodiments of the present disclosure. Each apparatus 100 may include a base plate 120, a surface plate 110, and a rotator 130 rotatably attaching surface plate 110 to base plate 120, in accordance with the description herein. For example, first apparatus 100*a* may include base plate 120*a* rotatably attached to surface plate 110*a* using a rotator (not shown), and second apparatus 100*b* may include base plate 120*b* rotatably attached to surface plate 110*b* using a rotator (not shown). In some embodiments, a speed controller 125 may not be installed on both first apparatus 100*a* and second apparatus 100*b*, but rather, a speed controller 125*a* may only be provided with first apparatus 100*a*.

Operations according to embodiments of the present disclosure will now be discussed with respect to FIG. 7 and FIGS. 6A-6F. FIG. 7 is a high-level flow diagram of operations for positioning an object into an upright position in accordance with embodiments of the present disclosure. FIGS. 6A-6F show a particular example of operations of an apparatus 100 configured for positioning an object into an upright position in accordance with embodiments of the present disclosure. In the example illustrated in FIGS. 6A-6F, apparatus 100*a* may include an apparatus configured as described above with respect to apparatus 100 of FIGS. 1-5B.

Figure 6A:
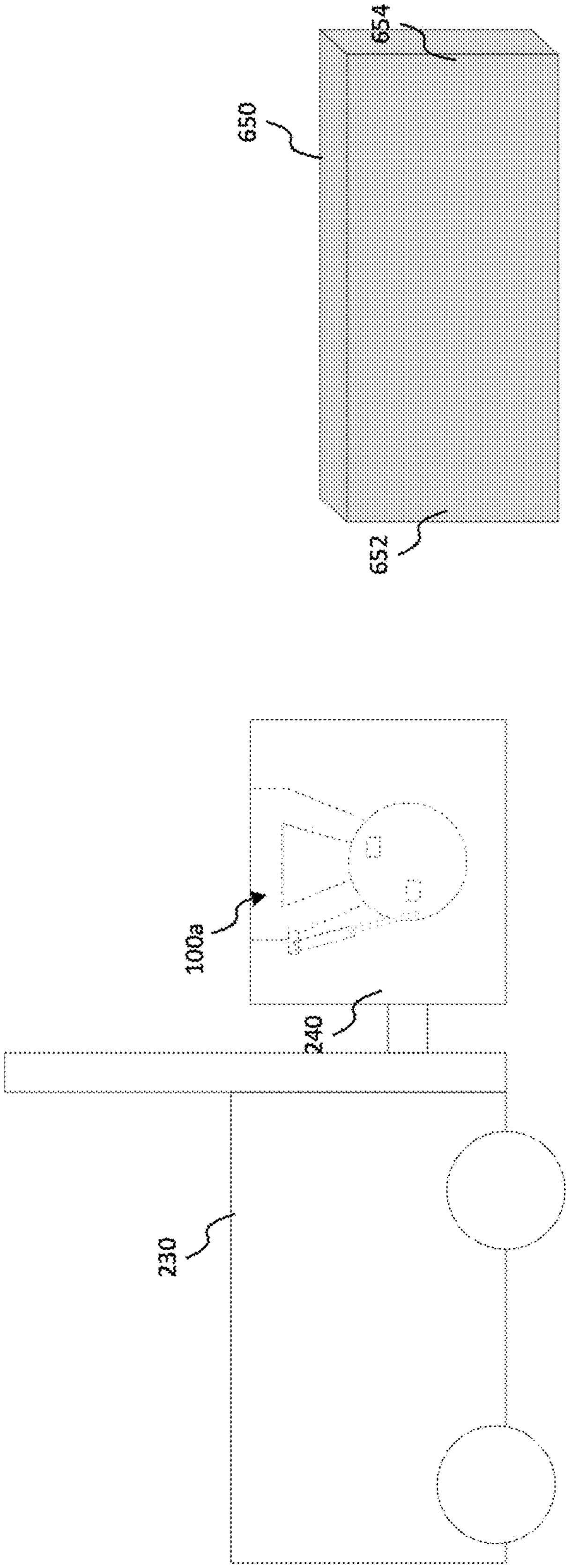
FIGS. 6A-6F show a particular example of operations of an apparatus configured for positioning an object into an upright position in accordance with embodiments of the present disclosure.
Figure 7:
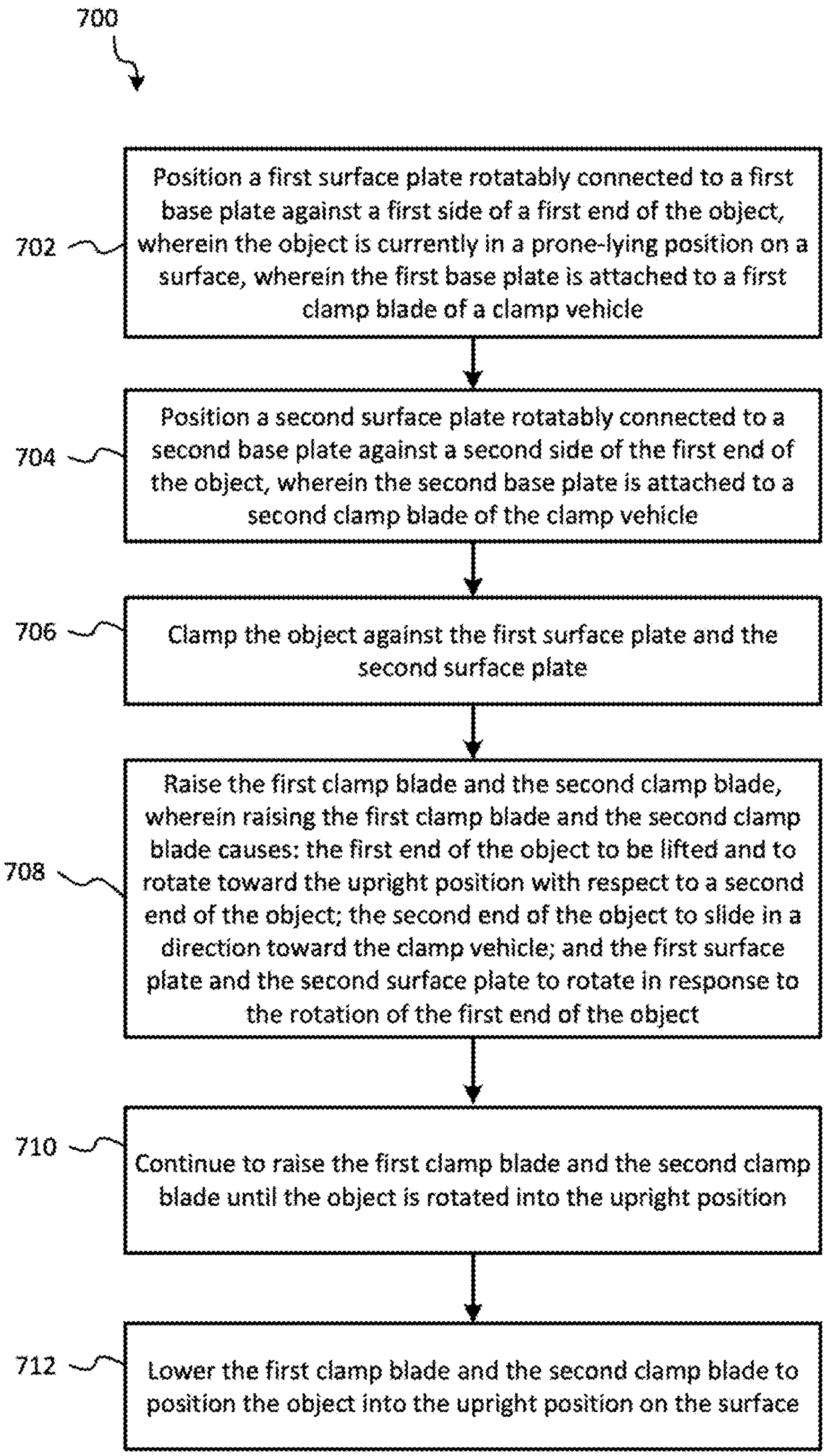
FIG. 7 is a high-level flow diagram of operations for positioning an object into an upright position in accordance with embodiments of the present disclosure.

As shown in FIG. 6A, first apparatus 100*a* may be installed onto right clamp arm 240 of clamp vehicle 230 and a second apparatus 100*b* may be installed onto left clamp arm 242 of clamp vehicle 230. In the example shown in FIG. 6A, second apparatus 100*b* may not be visible due to the perspective angle, but it may be appreciated that first apparatus 100*a* and second apparatus 100*b* may be arranged as illustrated in FIG. 5. In this example, object 350 may currently be in a prone-lying position. As shown, object 350 may have proximal end 652 and distal end 654.

Figure 6B:
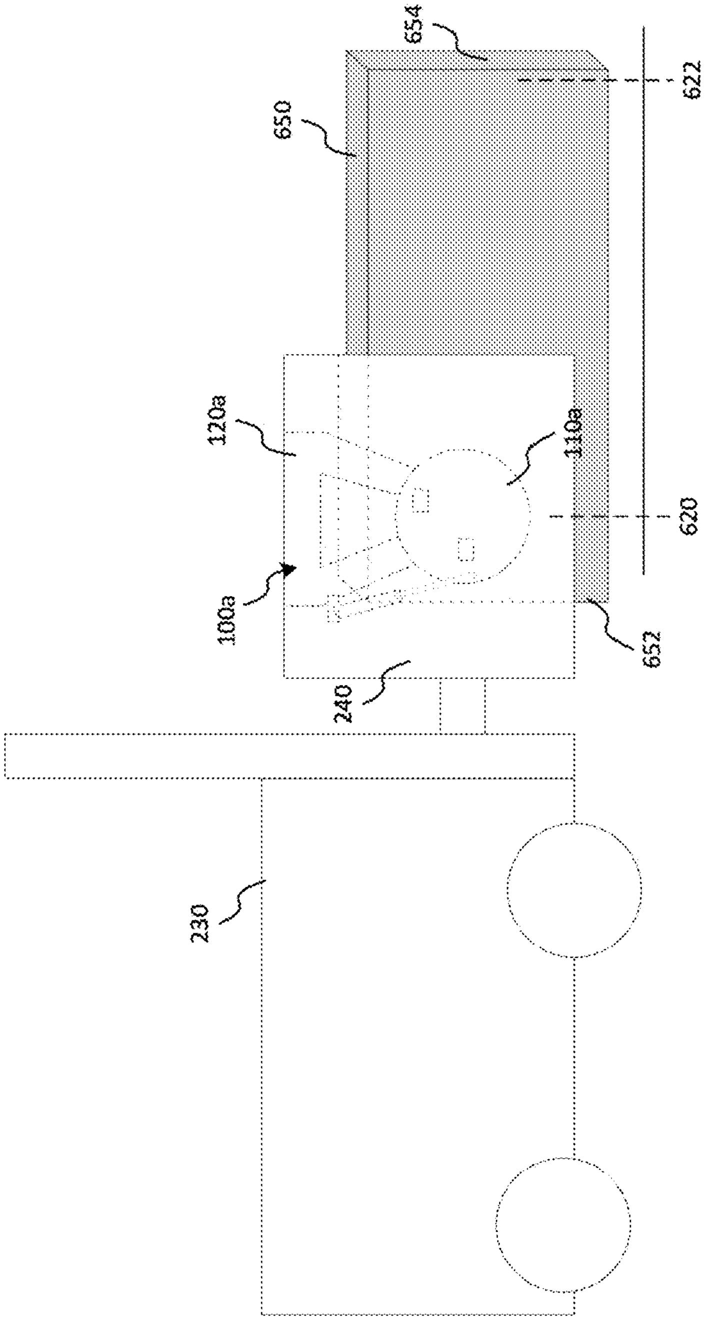

At block 702, a first surface plate rotatably connected to a first base plate is positioned against a first side of a first end of the object. For example, as shown in FIG. 6B, surface plate 110*a* of first apparatus 100*a*, which may be rotatably connected to base plate 120*a*, may be positioned against a first side (e.g., the side of object 650 facing first apparatus 100*a*) of proximal end 652 of object 650. In embodiments, positioning a surface plate against a side of proximal end 652 of object 650 may include positioning the surface plate within the half of object 650 closest to proximal end 652, and may not necessarily require positioning the surface plate against a precise point of proximal end 652. In embodiments, it may be sufficient to position the surface plate against a point offset from the balance point (e.g., the center of gravity) of object 650 such that, upon lifting proximal end 652 of object 650, the weight of distal end 654 of object 650 pushes distal end 654 of object 650 down while proximal end 652 of object 650 is pulled up.

At block 704, a second surface plate rotatably connected to a second base plate is positioned against a second side of the first end of the object. For example, although not shown explicitly in FIG. 6B, a surface plate 110*b* of a second apparatus 100*b* (e.g., second apparatus 100*b* in FIGS. 5A and 5B), which may be rotatably connected to a base plate of the second apparatus 100*b*, may be positioned against a second side (e.g., the side of object 650 opposite to the side facing first apparatus 100*a*) of proximal end 652 of object 650. In this manner, a surface palate of an apparatus 100 may be place against each of opposite sides of proximal end 652 of object 650.

It is noted that, at this point, proximal end 652 of object 650 may be located at approximately point 620, while distal end 654 of object 650 may be located at approximately point 622, and at this point, proximal end 652 and distal end 654 may lie along a horizontal line parallel to ground, as object 650 may be currently prone-lying.

At block 706, the object may be clamped against the first surface plate and the second surface plate. For example, with surface plate 110*a* of first apparatus 100*a* positioned against the first side of proximal end 652 and surface plate 110*b* of second apparatus 100*b* positioned against the second side (e.g., the side opposite to the first side) of proximal end 652, clamp vehicle 230 may be activated to clamp right clamp arm 240 and left clamp arm 240 (not explicitly shown in FIG. 6B) by moving right clamp arm 240 and left clamp arm 240 together, which may cause surface plate 110*a* to press against the first side of proximal end 652 and surface plate 110*b* of the second apparatus 100*b* to press against the second side of proximal end 652, squeezing and securing proximal end 652 of object 650 between surface plate 110*a* of first apparatus 100*a* and surface plate 110*b* of second apparatus 100*b*. The clamping pressure against proximal end 652 may create a friction between the first side of proximal end 652 and surface plate 110*a*, and between the second side of proximal end 652 and surface plate 110*b*.

Figure 6C:
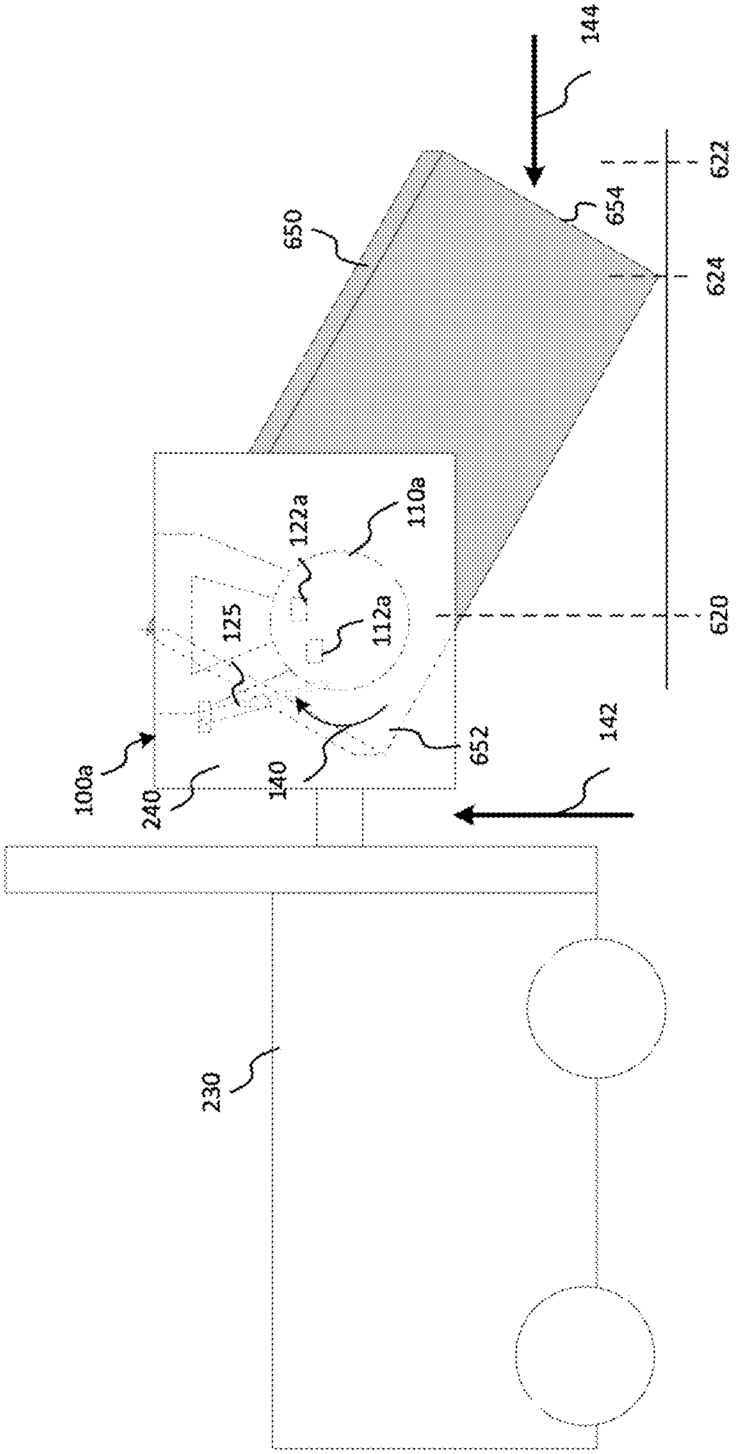

At block 708, the first clamp blade (or clamp arm) and the second clamp blade (or clamp arm) are raised. For example, as shown in FIG. 6C, clamp vehicle 230 may be activated to raise right clamp arm 240 and left clamp arm 242 (not explicitly shown in FIG. 6C), in vertical upwards direction 142. In this case, right clamp arm 240 and left clamp arm 242 are raised straight up in a vertical direction. In embodiments, raising right clamp arm 240 and left clamp arm 242 in vertical upwards direction 142 may cause proximal end 652 to be lifted in vertical upwards direction 142. For example, raising right clamp arm 240 and left clamp arm 242 may cause first apparatus 100*a* and second apparatus 100*b* to also rise vertically upwards, which may cause surface plate 110*a* and surface plate 100*b* to rise vertically upwards. As surface plate 110*a* may be pressing against the first side of proximal end 652 and surface plate 110*b* may be pressing against the second side of proximal end 652 exerting a clamping pressure (e.g., a squeezing pressure) against proximal end 652, the frictional contact created by the clamping pressure may cause surface plate 110*a* and surface plate 110*b* to pull proximal end 652 in the vertical upwards direction, causing proximal end 652 to be lifted in vertical upwards direction 142.

In embodiments, the lifting of proximal end 652 in vertical upwards direction 142 may cause object 650 to rotate toward the upright position in rotation direction 140. For example, as the lifting force is being applied onto proximal end 652, and as proximal end 652 rises straight up in the vertically upwards direction 142, the weight of distal end 654, which may not experience a lifting force, may push distal end 654 in the downward direction, which may create a rotational force being exerted onto object 650 in rotation direction 140. In embodiments, rotation direction 140 may be directed in the clockwise direction as referenced from the perspective of an observer viewing FIG. 6C. However, the direction of rotation direction 140 may be counterclockwise as experience from the perspective of surface plate 110*a*, and clockwise as experience from the perspective of surface plate 110*b*.

In embodiments, object 650 may be allowed to rotate toward the upright position in rotation direction 140. For example, the configuration of surface plate 110*a* and surface plate 110*b* (e.g., the rotatable connection between the respective surface plate and the corresponding base plate) may allow surface plate 110*a* and surface plate 110*b* to rotate about an axis normal to the respective base plate to which each of surface plate 110*a* and surface plate 110*b* may be connected, while maintaining frictional contact securing proximal end 652 o object 650. For example, in this example, both surface plate 110*a* and surface plate 110*b* may rotate in rotation direction 140. In this manner, object 650 may rotate toward the upright position in rotation direction 140 while being securely hold between surface plate 110*a* and surface plate 110*b*.

In embodiments, the lifting of proximal end 652 in vertical upwards direction 142 may cause distal end 654 to shift or slide in horizontal direction 144, which may be a direction toward point 620. At this point, point 620 may be the point approximately directly under proximal end 652 of object 650. At this point, proximal end 652 of object 650 may be located above approximately point 620, while distal end 654 of object 650 may now be shifted to approximately point 624. At this point, proximal end 652 and distal end 654 may lie along a line that is no longer horizontal, but diagonal with respect to ground.

In this example, first apparatus 100*a* may include speed controller 125. In this example, second apparatus 100*b* may not include a speed controller. In embodiments, speed controller 125 may provide a resistance against the rotation of surface plate 110*a* (and of object 650) in rotation direction 140. For example, as surface plate 110*a* rotates in rotation direction 140, speed controller may experience a longitudinal compression force, against which speed controller 125 may resist. In this manner, speed controller 125 may provide a resistance controlling the rotation of surface plate 110*a* in rotation direction 140 such that surface plate 110*a* may not rotate too fast, which may cause problems.

As shown in FIG. 6C, as surface plate 110*a* rotates in rotation direction 140, second stopper component 112*a* may move toward first stopper component 122*a* due to the rotation of surface plate 110*a*. At this point, as surface plate 110*a* has not reached the rotation threshold, which in this example may be ninety degrees of rotation, second stopper component 112*a* may not yet be in contact with first stopper component 122*a*.

Figure 6D:
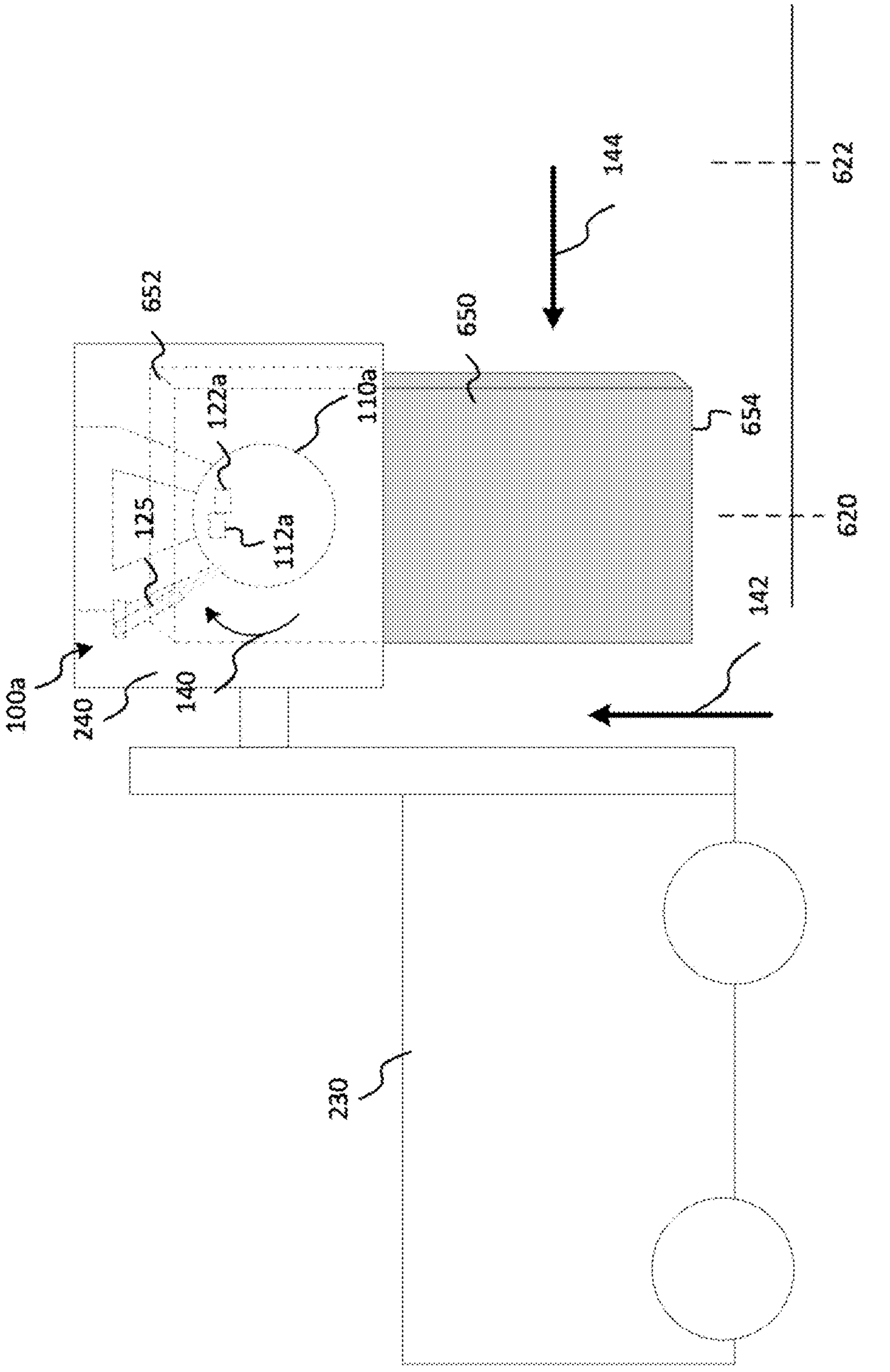

At block 710, the first clamp blade and the second clamp blade continue to be raised until the object is rotated into the upright position. For example, as shown in FIG. 6D, clamp vehicle 230 may continue to raise right clamp arm 240 and left clamp arm 242 (not explicitly shown in FIG. 6D) in vertical upwards direction 142 until object 650 is in an upright position. In this example, the continued lifting of right clamp arm 240 and left clamp arm 242 may cause proximal end 652 to continue to be lifted (e.g., by the clamping pressure exerted by surface plate 110*a* and surface plate 110*b*) in vertical upwards direction 142, while distal end 654 may not be lifted, thereby continuing to exert the rotational force against object 650 in rotation direction 1401. Distal end 654 may continue to shift in direction 144 toward point 620.

The rotational force exerted against object 650 due to the weight of distal end 654 and the shifting of distal end 654 in direction 144 toward point 620 may cause object 650 to rotate completely into the upright position as shown in FIG. 6D. In this case, distal end 654 may be located at point 620, which may be directly under proximate end 652, which means that object 650 at this point is in the upright position standing up. At this point, proximal end 652 and distal end 654 may lie along a line that is vertical with respect to ground.

In embodiments, as the rotation of object 650 reaches ninety degrees, which in this example means that surface plate 110*a* may have rotated ninety degrees from the starting position (e.g., the position of surface plate 110*a* shown at FIG. 6B), second stopper component 112*a* may contact first stopper component 122*a*. As first stopper component 122*a* is fixedly coupled (e.g., securely attached) to base plate 120*a* of first apparatus 100*a*, and as second stopper component 112*a* is fixedly coupled to surface plate 110*a*, first stopper component 122*a* may prevent surface plate 110*a* from rotating past the ninety degrees of rotation threshold. In this manner, object 650 may not rotate past ninety degrees of rotation in the upright position.

Figure 6E:
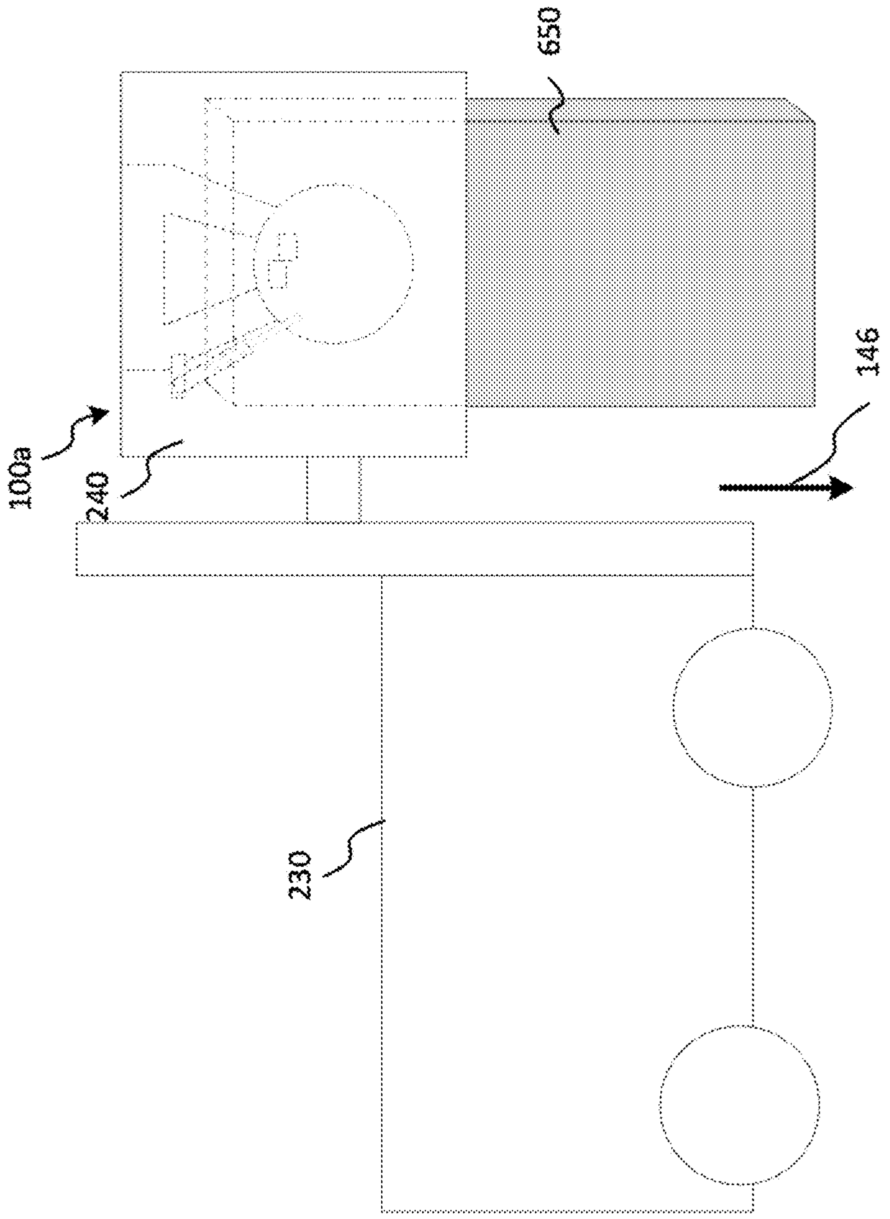

At block 712, the first clamp blade and the second clamp blade are lowered to position the object into the upright position on the surface. For example, as shown in FIG. 6E, clamp vehicle 230 may lower right clamp arm 240 and left clamp arm 242 (not explicitly shown in FIG. 6E) in vertical downward direction 146 until object 650 makes contact with the ground. As object 650 may not be in the upright position, object 650 is placed in the upright position. In this manner, operation according to embodiments may operate to position an object into an upright position.

Figure 6F:
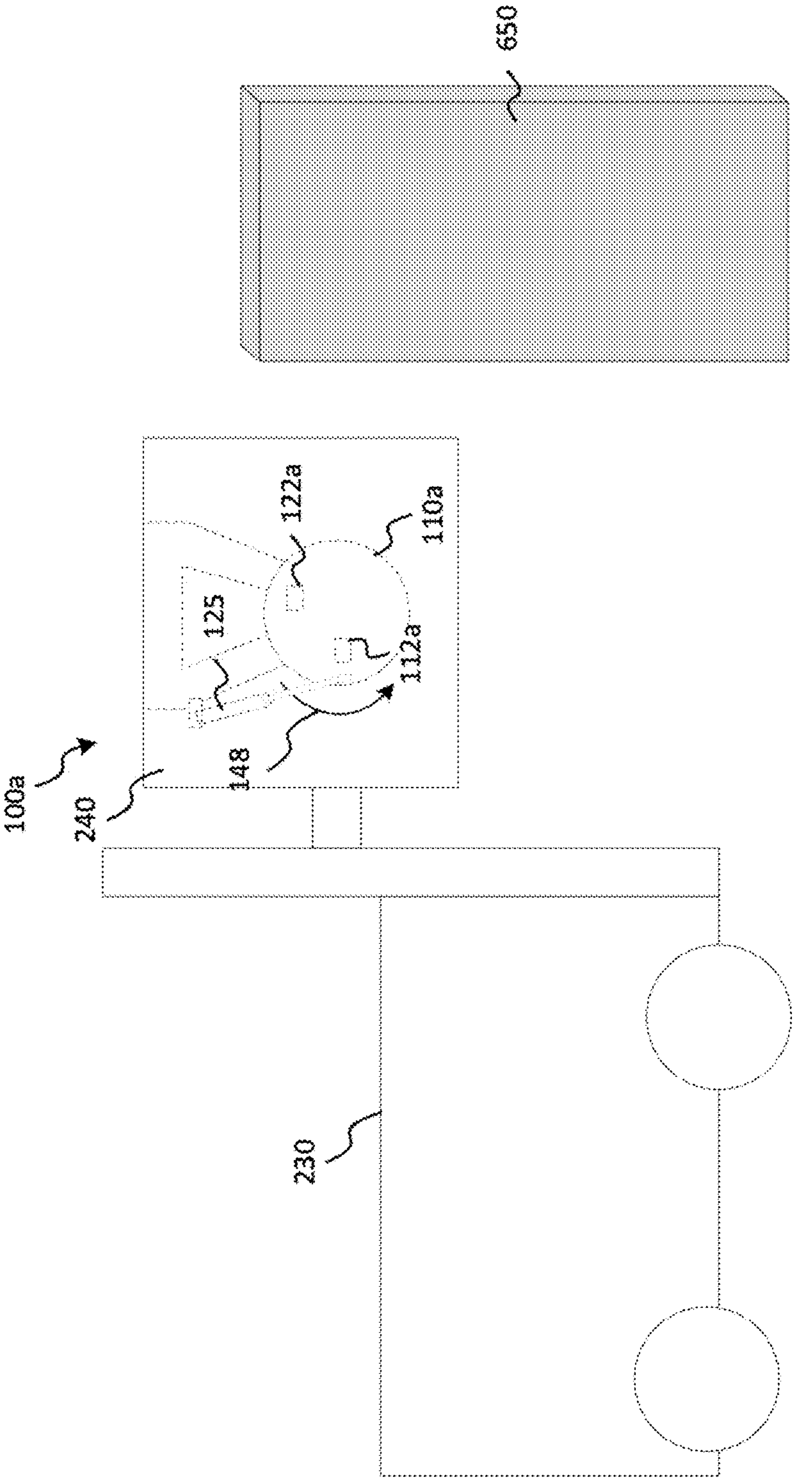

In embodiments, as shown in FIG. 6F, after placing object 650 on the ground in the upright position, clamp vehicle 230 may be activated to cease clamping right clamp arm 240 and left clamp arm 240 (not explicitly shown in FIG. 6B) by moving right clamp arm 240 and left clamp arm 240 in a direction away from each other, which may cause surface plate 110*a* to move away from the first side of proximal end 652 and surface plate 110*b* of second apparatus 100*b* to move away from the second side of proximal end 652, thereby ceasing to squeeze proximal end 652 of object 650.

In embodiments, the removal of the clamping pressure from clamp vehicle 230 against surface plate 110 and surface plate 110*b* may cause speed controller 125 of first apparatus 100*a* to push against surface plate 110*a*. The pushing force from speed controller 125 may cause surface plate 110*a* to rotate in a rotation direction 148, away from speed controller 125. The rotation of surface plate 110*a* in the rotation direction may separate second stopper component 112*a* from first stopper component 122*a* and may return surface plate 110*a* to the starting position of surface plate 110*a* (e.g., the position of surface plate 110*a* shown at FIG. 6B).

In embodiments, positioning object 650 into an upright position may include positioning object 650 from a first position (e.g., a prone/lying position) on a first surface into a second position (e.g., upright position) on the first surface or a second surface. For example, object 650 may be positioned (e.g., in accordance with embodiments of the present disclosure) from a generally horizontal position on a portion of a surface into an a generally vertical position on the surface, a different portion of the same surface, or a different surface. In some embodiments, positioning object 650 into an upright position may include positioning object 650 from a current prone-lying position on a first surface into an upright position on a second surface different from the first surface. For example, object 650 may be positioned (e.g., in accordance with embodiments of the present disclosure) from a current prone-lying position on at least a portion of a surface (e.g., a floor surface, a shipping container, a bed of a vehicle, a vehicle container, etc.) into an upright position on at least a portion of a different surface (e.g., a floor surface, a shipping container, a bed of a vehicle, a vehicle container, etc.).

Figure 8:
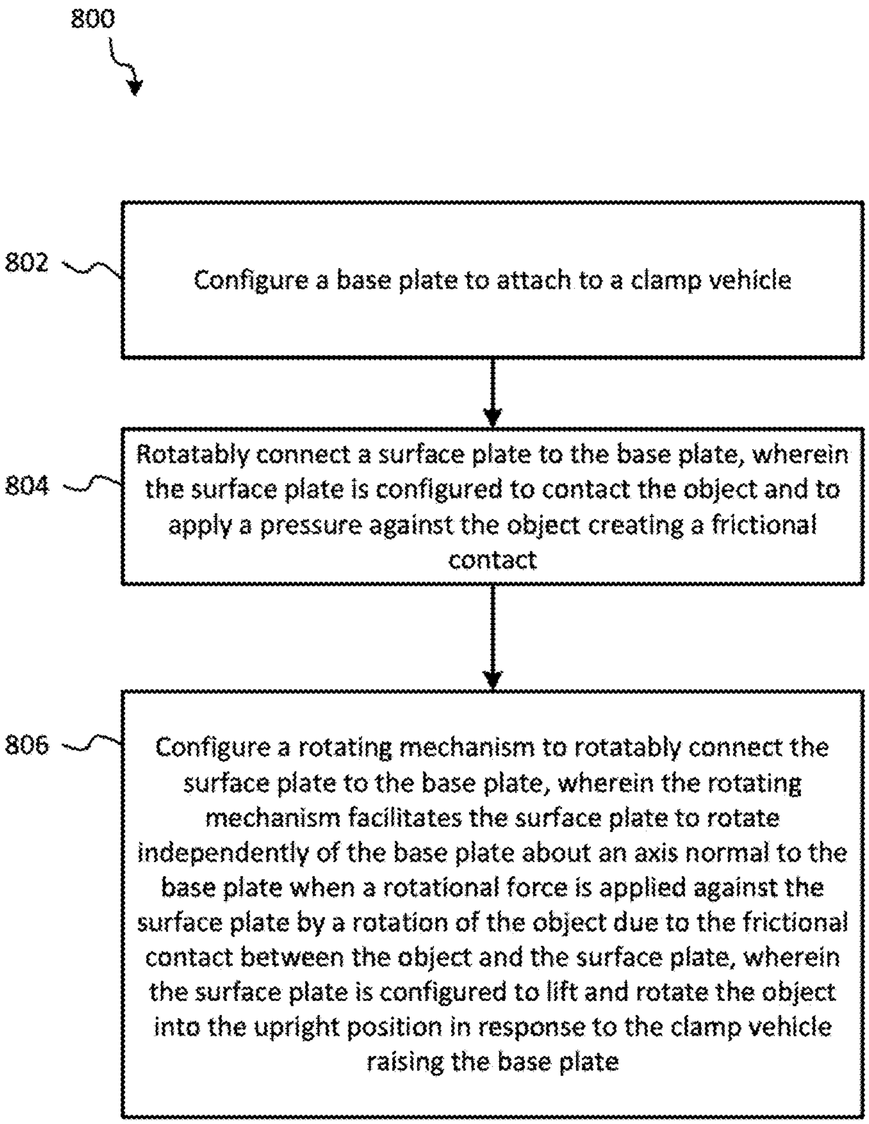
FIG. 8 shows an exemplary flow diagram of operations for manufacturing an apparatus configured for positioning an object into an upright position in accordance with embodiments of the present disclosure.

A method of manufacturing an apparatus configured for positioning an object into an upright position in accordance with embodiments of the present disclosure will now be discussed with respect to FIG. 8. FIG. 8 shows an exemplary flow diagram 800 of operations for manufacturing an apparatus configured for positioning an object into an upright position in accordance with embodiments of the present disclosure. For example, the steps illustrated in the example blocks shown in FIG. 8 may be performed to manufacture apparatus 100 of FIGS. 1-6F, according to embodiments herein.

At block 802, a base plate may be configured to attach to a clamp vehicle. For example, a base plate (e.g., base plate 120 as illustrated in FIGS. 1-6F) may be configured to attach to a clamp vehicle (e.g., a clamping and lifting system) according to configuration and functionality described with respect to embodiments of the present disclosure.

At block 804, a surface plate is rotatably connected to the base plate. In embodiments, the surface plate may be configured to contact the object and to apply a pressure against the object creating a frictional contact. For example, a surface plate (e.g., surface plate 110 as illustrated in FIGS. 1-6F) may be rotatably connected to a base plate (e.g., e.g., base plate 120 as illustrated in FIGS. 1-6F) of an apparatus (e.g., apparatus 100, as illustrated in FIGS. 1-6F) according to the and functionality described with respect to embodiments of the present disclosure.

At block 806, a rotator is configured to rotatably connect the surface plate to the base plate. In embodiments, the rotator may facilitate the surface plate to rotate independently of the base plate about an axis normal to the base plate when a rotational force is applied against the surface plate by a rotation of the object due to the frictional contact between the object and the surface plate. In embodiments, the surface plate may be configured to lift and rotate the object into the upright position in response to the clamp vehicle raising the base plate. For example, a rotator (e.g., rotator 130 as illustrated in FIGS. 1-6F) may be configured to rotatably connect the surface plate (e.g., surface plate 110 as illustrated in FIGS. 1-6F) to the base plate (e.g., base plate 120 as illustrated in FIGS. 1-6F) according to the and functionality described with respect to embodiments of the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112 (f). Even under the broadest reasonable interpretation, in light of this paragraph of this specification, the claims are not intended to invoke 35 U.S.C. § 112 (f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. An apparatus for positioning an object into an upright position, comprising:

a base plate configured to operably couple to a lifting device;

a surface plate rotatably coupled to the base plate, wherein the surface plate is configured to apply a force against a first portion of the object and another surface plate rotatably coupled to another base plate, wherein the other surface plate is configured to apply a force against a second portion of the object different from the first portion; and a rotator configured to rotatably connect the surface plate to the base plate, wherein the rotator allows the surface plate to independently rotate about an axis of the base plate when a rotational force is applied to the surface plate by a rotation of the object, wherein the rotator is disposed between the base plate and the surface plate without extending through either the base plate or the surface plate, and wherein the rotator includes:

a first component coupled to the base plate;

a second component coupled to the surface plate; and a bearing connecting the first component of the rotator to the second component of the rotator and allowing the second component of the rotator to rotate about an axis of the first component of the rotator, wherein the surface plate is configured to lift and rotate the object into the upright position in response to the lifting device raising the base plate.

2. The apparatus of claim 1, wherein the lifting device is clamp vehicle.

3. The apparatus of claim 1, further comprising a speed controller configured to apply a resistance against the surface plate to limit the rotation of the surface plate in a first direction due to a rotation the object and restrain a speed of the rotation of the surface plate in the first direction.

4. The apparatus of claim 1, wherein the speed controller is configured to rotatably retract the surface plate to a starting position of the surface plate.

5. The apparatus of claim 1, further comprising a rotation stopper configured to prevent further rotation of the surface plate beyond a threshold amount of rotation from a starting position of the surface plate.

6. The apparatus of claim 5, wherein the rotation stopper includes a first stopper component fixedly attached to the base plate at a first location and a second stopper component fixedly attached to the surface plate at a second location, and wherein the first location of the first stopper component and the second location of the second stopper component are configured such that the first component and the second are not in contact at the starting position of the surface plate and such that the first component and the second are in contact when the rotation of the surface plate reaches the threshold amount of rotation from the starting position of the surface plate.

7. The apparatus of claim 1, wherein the surface plate includes a surface liner disposed on a top surface of the surface plate.

8. The system of claim 1, wherein the first surface plate includes a first surface liner disposed on a top surface of the first surface plate, and the second surface plate includes a second surface liner disposed on a top surface of the second surface plate.

9. A system for positioning an object into an upright position, comprising:

a clamp vehicle having a first clamp blade and a second clamp blade, wherein the clamp vehicle is operable to provide a compressive force between the first clamp blade and the second clamp blade;

a first base plate operably coupled to the first clamp blade of the clamp vehicle;

a second base plate operably coupled to the second clamp blade of the clamp vehicle;

a first surface plate rotatably coupled to the first base plate, wherein the first surface plate is configured to contact a first portion of an object;

a second surface plate rotatably coupled to the second base plate, wherein the second surface plate is configured to contact a second portion of the object in a first position, wherein the first surface plate and the second surface plate compress the object in response to the clamp vehicle applying a compressive force, wherein the system is configurable to lift at least a portion of the object compressed between the first surface plate and the second surface plate via the clamp vehicle and rotate the object into a second position via the first surface plate and the second surface plate;

a first rotator configured to rotatably couple the first surface plate to the first base plate, wherein the first rotator facilitates the first surface plate to rotate independently of the first base plate about an axis when a rotational force is applied against the first surface plate by a rotation of the object, wherein the first rotator is disposed between the first base plate and the first surface plate without extending through either the first base plate or the first surface plate; and a second rotator configured to rotatably couple the second surface plate to the second base plate, wherein the second rotator facilitates the second surface plate to rotate independently of the second base plate about an axis of the second base plate when a rotational force is applied to the second surface plate by a rotation of the object, wherein the second rotator is disposed between the second base plate and the second surface plate without extending through either the second base plate or the second surface plate.

10. The system of claim 9, wherein the first rotator includes a first component coupled to the first base plate and a second component coupled to the first surface plate.

11. The system of claim 10, wherein the first rotator includes a first bearing connecting the first component of the first rotator to the second component of the first rotator and allows the second component of the first rotator to rotate about an axis of the first component of the first rotator.

12. The system of claim 9, wherein the second rotator includes a first component coupled to the second base plate and a second component coupled to the second surface plate.

13. The system of claim 12, wherein the second rotator includes a second bearing connecting the first component of the second rotator to the second component of the second rotator and allows the second component of the second rotator to rotate about a normal axis of the first component of the second rotator.

14. The system of claim 9, further comprising a speed controller connected between the first base plate and the first surface plate, the speed controller configured to:

apply a resistance against the first surface plate to limit the rotation of the surface plate in a first direction due to a rotation the object and restrain a speed of the rotation of the surface plate in the first direction; and rotatably retract the first surface plate to a starting position of the surface plate.

15. The system of claim 9, further comprising a rotation stopper connected to the first base plate and the first surface plate, the rotation stopper configured to prevent further rotation of the first surface plate beyond a threshold amount of rotation from a starting position of the first surface plate.

16. The system of claim 15, wherein the threshold amount of rotation from the starting position of the first surface plate is 90 degrees of rotation.

17. The system of claim 15, wherein the rotation stopper includes a first stopper component fixedly attached to the first base plate at a first location and a second stopper component fixedly attached to the first surface plate at a second location, and wherein the first location of the first stopper component and the second location of the second stopper component are configured such that the first component and the second are not in contact at the starting position of the first surface plate and such that the first component and the second are in contact when the rotation of the first surface plate reaches the threshold amount of rotation from the starting position of the first surface plate.

* * * * *